Jan. 9, 1934.  E. P. SHERMAN  1,943,093
BASKET COVER
Filed Dec. 2, 1932
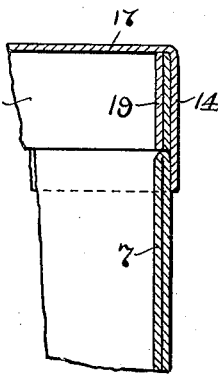
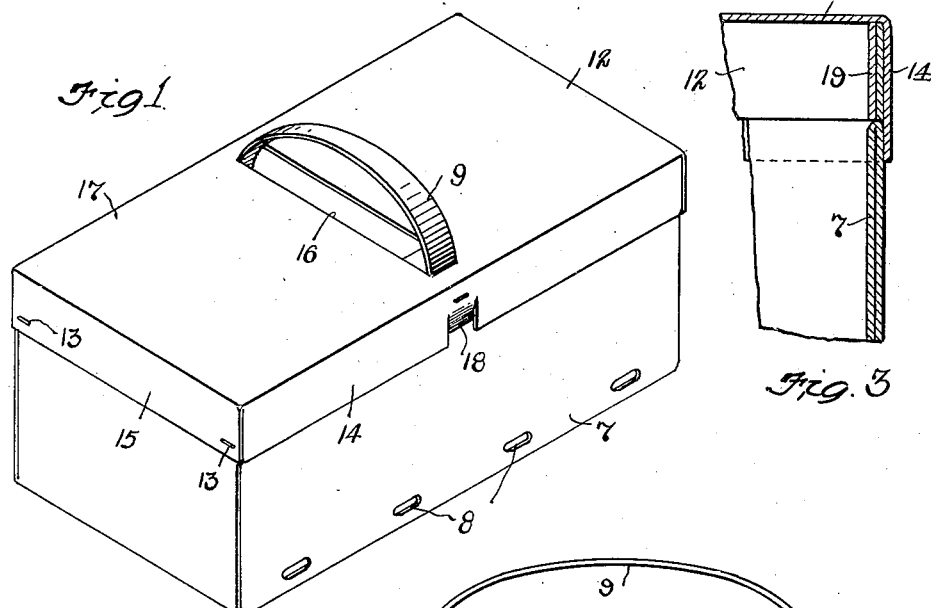
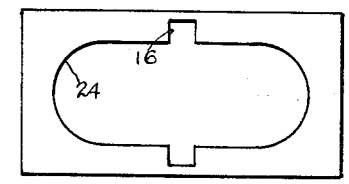
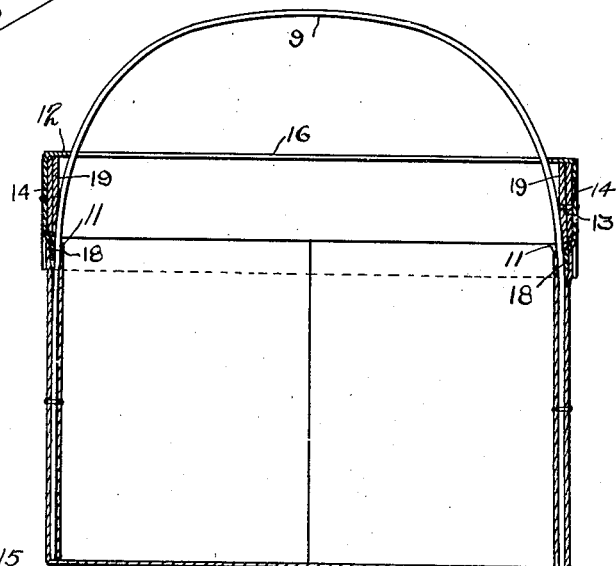
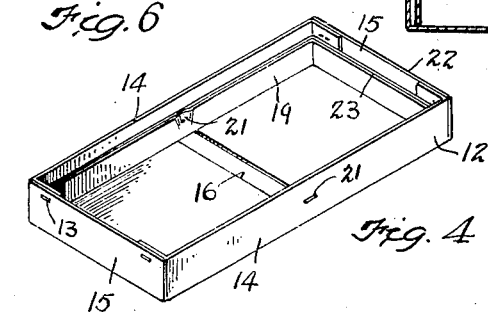
INVENTOR.
Elroy P. Sherman
BY
Fay, Oberlin & Fay
ATTORNEYS Patented Jan. 9, 1934

1,943,093

UNITED STATES PATENT OFFICE 1,943,093

BASKET COVER

Elroy P. Sherman, Ashtabula, Ohio, assignor to The Ashtabula Corrugated Box Company, Ashtabula, Ohio, a corporation of Ohio Application December 2, 1932. Serial No. 645,374

5 Claims. (Cl. 229—43)

The present invention relates to a cover for baskets and is more particularly directed to a cover for a basket made of corrugated paperboard and having an arched handle of conventional type.

In the construction of containers for shipping and marketing produce, such as fruit, it is desirable to provide a container which is pleasing in appearance, especially for the higher grades of fruit, and which will, at the same time, adequately retain and protect the contents during handling. Such containers are described in my co-pending applications Serial No. 608,940, filed May 3, 1932, and Serial No. 611,062, filed May 13, 1932. It is also necessary that the cover of such a basket or container should not rest on the fruit to avoid bruising. A cover which fitted down closely on the top of the basket would necessarily rest on the contents since the fruit is packed so as to project somewhat above the top edges of the container in order to present an attractive appearance when the cover is removed. The present invention contemplates the provision of a cover for baskets of the above described characteristics made of corrugated paperboard, which is well adapted for making up a basket of neat and pleasing appearance appropriate to contain fruits of the higher grades.

Accordingly, it is an object of the present invention to provide a basket cover which accommodates an arched basket handle and which is securely held in place on such basket. Another object of the invention is to provide a basket cover which adequately protects and secures the contents of the basket but which does not rest on such contents. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a perspective view of a basket showing the improved cover in place; Fig. 2 is a transverse section through the basket and cover; Fig. 3 is a fragmentary section through the basket and cover; Fig. 4 is a perspective view of the cover in inverted position; and Figs. 5 and 6 are top plan views of alternative forms of the cover.

Referring to the drawing, a basket 7 is made up of corrugated paperboard, a single blank being used and this latter being folded and interlocked, using a minimum number of staples or other fastenings. Air holes 8 are distributed near the bottom of the container for ventilation. The box is constructed of a double thickness of such corrugated board and is provided with an arched handle 9 of wood or other suitable material, the handle being disposed between the two thicknesses of the container walls and passing through slots 11 cut in the top edge of the container to receive it.

A cover 12 is also made of corrugated board cut out in the form of a single blank and folded to form the cover. Staples 13 serve to hold the side flanges 14 and the end flanges 15 of the cover together. A slot 16 is cut transversely across the top 17 of the cover to permit the handle 9 of the basket to pass therethrough and tabs 18 formed in the side flanges 14 of the cover by incisions therein and being two in number also enter the slots 11 to aid in retaining the cover securely in place. These tabs can, however, be omitted if desired, as shown in Fig. 4 of the drawing.

Within the cover and disposed adjacent the inner sides of the flanges 14 and 15 is a liner or abutment strip 19 preferably attached to the cover by means of staples 21 and formed of at least one strip of corrugated paperboard although two such strips will ordinarily be found preferable. This liner is of a width less than the width of the cover flanges and, consequently, terminates short of the edges 22 of such flanges. The purpose of the liner is to provide a bearing surface for the cover, holding the same somewhat above the top edge of the basket, the top edges of the basket abutting the bottom edges 23 of the liner. As a result, the cover, as seen in Figs. 2 and 3, does not fit all the way down with the top 12 resting on the top of the basket but this top is removed from the basket a distance equal to the width of the liner 19. The side flanges of the cover thus overlap and surround the top of the basket by an amount equal to the distance between the width of a liner and the width of the cover flanges, this difference being left sufficiently great to adequately secure the cover in place. This liner which keeps the cover elevated above the basket may be made of wood, single wall corrugated board, double wall corrugated board, or strips of cellotex, or other similar material. Where the tabs 18 are used, these will be inserted into the side walls of the basket so that the outer thickness of such side wall lies between the tab on one side and the cover flange on the other side.

It will be seen that the cover as described above is well adapted to secure and protect the contents of a fruit basket or similar container and will not rest on fruit which may be packed with a swell causing the contents to extend above the edge of the basket so as to present an attractive appearance. Since a cover thus formed of corrugated board or the like may be given a neat appearance, with sharp corners, the container as a whole preserves a neat appearance in keeping with the character of the box and suitable for the packing and display of high quality produce. If desired, the cover may be provided with inspection holes 24 through which the contents can be seen without removing the cover, as shown in Fig. 5. Alternatively, such inspection holes may be covered with sheets of cellophane 25, as seen in Fig. 6 of the drawing, or other suitable transparent tissue may be used. Of course, the shape and pattern of such inspection holes can be varied as circumstances require and the holes or slots may be covered with cellophane, or this may be omitted. The use of the transparent material for covering the inspection slots helps to exclude dust and insects to some extent from the basket and it is desirable for this reason. The resultant covered basket is inexpensive to make and of rugged construction while presenting an attractive appearance due to definite outlines, square corners, and flat surfaces presenting a neat and trim package suitable for fancy package fruit.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A basket cover comprising a top, side and end flanges adapted to fit over the top of a basket, a transverse slot in said top for the reception of a basket handle, a liner in said cover adjacent said side and end flanges and adapted to abut the top edges of a basket, and tabs on the side flanges in line with said transverse slot and adapted to be inserted within the walls of a basket.

2. A basket cover comprising a top, side and end flanges adapted to fit over and around the top of a basket, a liner in said cover adjacent the inner sides of said flanges and terminating short of the edges of said flanges, a slot in said cover for the reception of an arched basket handle, and tabs on the side flanges adapted to be inserted in the side walls of such basket adjacent the handle.

3. A basket cover comprising a top having display cut-outs therein, said cut-outs also defining a passage for a basket handle, side and end flanges adapted to fit over and around the top of a basket, and a liner in said cover adjacent the inner sides of said flanges and terminating short of the edges thereof, said liner being adapted to engage the top edges of the walls of the basket to which the cover is applied.

4. A basket cover comprising a top and side and end flanges of corrugated paperboard, said top having cut-outs therein for display and for the passage of a basket handle, said display cut-outs being covered with a transparent material, said side and end flanges being adapted to fit over and around the top of a basket, and a liner in said cover consisting of at least one thickness of corrugated paperboard and terminating short of the edges of said flanges.

5. A basket cover comprising a top, side and end flanges adapted to fit over the top of a basket, a transverse slot in said top for the reception of a basket handle, a liner in said cover adjacent said side and end flanges and adapted to abut the top edges of a basket, the lower part of said liner being reduced in thickness to fit the handle.

ELROY P. SHERMAN.